No. 621,533. Patented Mar. 21, 1899.
W. H. MAY.
KITCHEN CABINET.
(Application filed Jan. 18, 1898.)
(No Model.) 2 Sheets—Sheet 1.
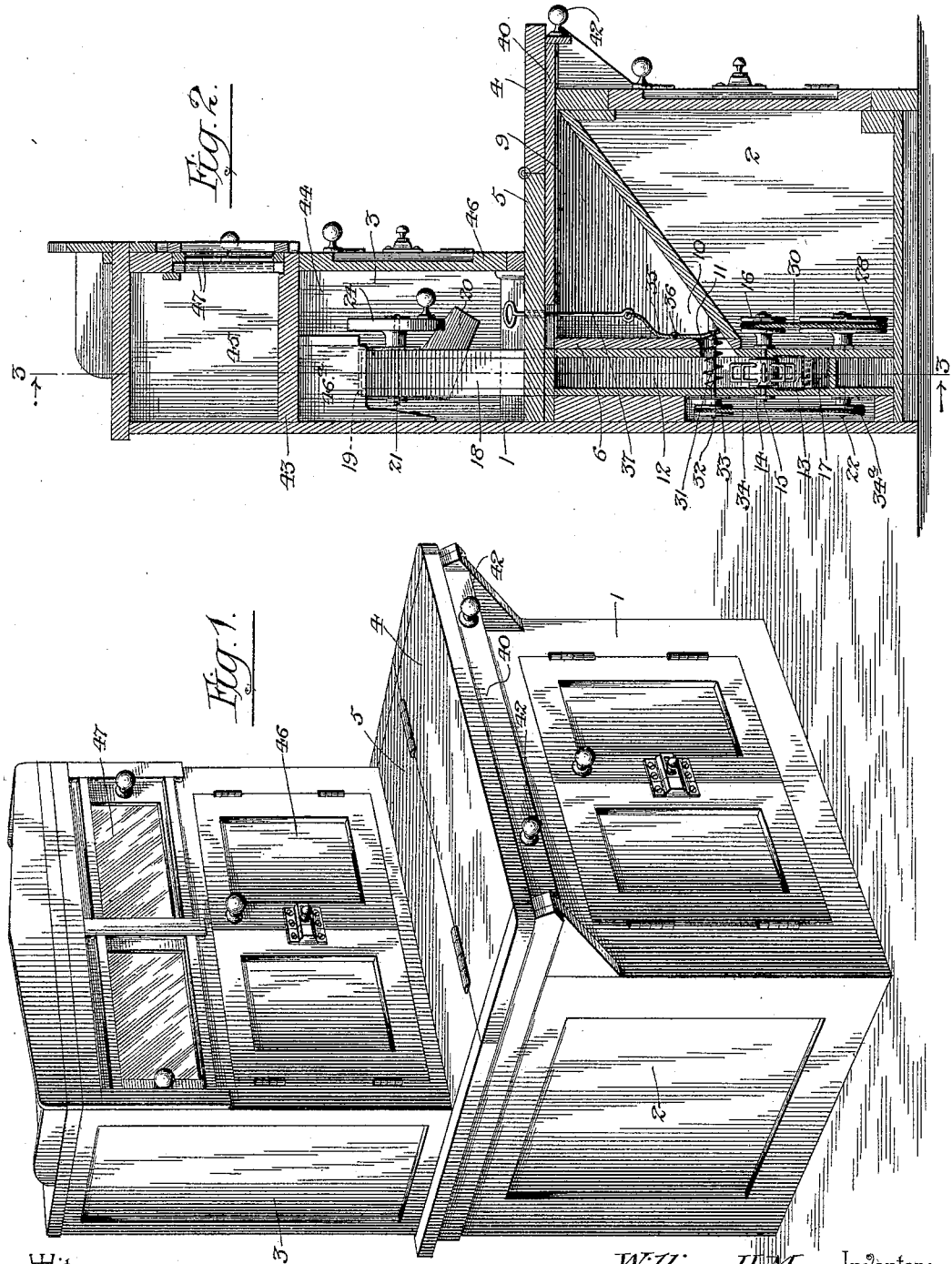
Witnesses:—
Louis M. F. Whitehead
H. F. Benford
William H. May, Inventor:—
By his Attorneys,
C. A. Snow & Co.

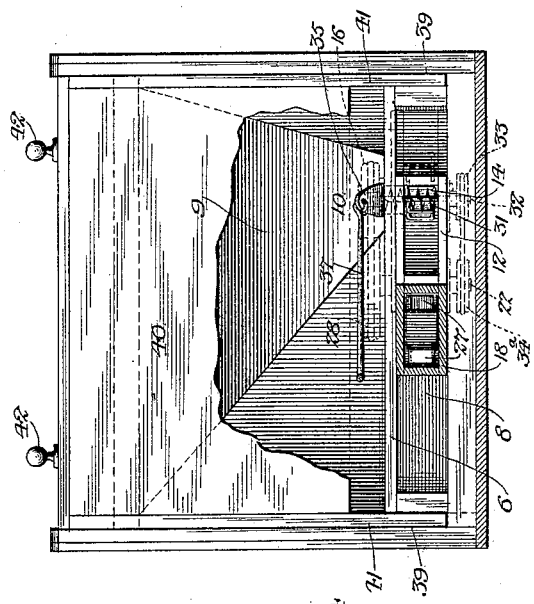

UNITED STATES PATENT OFFICE.

WILLIAM HAMILTON MAY, OF OTWELL, INDIANA.

KITCHEN-CABINET.

SPECIFICATION forming part of Letters Patent No. 621,533, dated March 21, 1899.

Application filed January 18, 1898. Serial No. 667,065. (No model.)

*To all whom it may concern:*

Be it known that I, WILLIAM HAMILTON MAY, a citizen of the United States, residing at Otwell, in the county of Pike and State of Indiana, have invented a new and useful Kitchen-Cabinet, of which the following is a specification.

This invention relates to improvements in kitchen-cabinets for the safe storage of flour or other cereals, groceries, meats, or vegetables, for cooking utensils, and for storing purposes generally; and one object that I have in view is to provide a simple and inexpensive structure which will present a neat appearance and which is especially designed for the safe storage of flour and analogous cereals.

A special object of the invention is to provide an improved cabinet with means by which the flour or cereal may be conveniently transferred from the storage-bin to the kneading-board or other receptacle without the necessity for handling the flour and by which any refuse or dirt in the flour may be eliminated therefrom in its transit from the bin to the delivery-spout of the elevator, such elevator and cleaning appliances being situated wholly at the rear side of the cabinet to take up a minimum amount of room and operated from a single source of power.

With these ends in view the invention consists in the novel construction and arrangement of parts, which will hereinafter be fully described and claimed.

In the accompanying drawings, Figure 1 is a perspective view of a kitchen-cabinet constructed in accordance with my invention. Fig. 2 is a vertical sectional view from front to rear of the cabinet on the plane indicated by the dotted line 2 2 of Fig. 3. Fig. 3 is a vertical transverse sectional view from side to side of the cabinet on the plane indicated by the dotted line 3 3 of Fig. 2. Fig. 4 is a horizontal sectional view on the plane indicated by the dotted line 4 4 of Fig. 3, with the kneading-board partly broken away and illustrating the storage-bin below the same.

Like numerals of reference denote like and corresponding parts in each of the several figures of the drawings.

The kitchen-cabinet 1 is divided into a lower compartment 2 and the cupboard 3.

The lower compartment 2 of the cabinet is constructed with a bin for the storage of flour or other cereals, and access to this bin is obtained through a hinged flap-door 4, forming a part of the top or cover 5 to the lower compartment 2. This flap-door 4 is situated at the front side of the cabinet in advance of the cupboard 3, so that it may be conveniently elevated to expose a part of the storage-bin for the purpose of placing the flour or other cereal in such bin.

Within the lower compartment 2 of the cabinet and adjacent to the back wall thereof I provide a partition or false back 6, which is arranged parallel to the back wall and extends across the cabinet from side to side, forming therein a narrow rear chamber 8, adapted to contain the elevating and cleaning appliances for the flour.

The flour or other cereal is stored in the bin or hopper 9, which is constructed within the compartment 2 of the cabinet and in advance of the narrow rear chamber 8, the false back or partition 6 forming the rear wall of the bin or hopper. The bottom of the hopper is indicated at 10 as consisting of a series of inclined boards or sections which converge from the side and front walls of the cabinet toward the false back or partition 6. The inclined bottom boards of the bin converge directly to a discharge-point, at which is provided the transverse delivery-port 11, which extends through the partition 6 and opens into the vertical chute 12. This vertical chute is constructed to fit within the narrow chamber 8 between the partition 6 and the back of the cabinet, and said vertical chute extends from the upper end of the bin or hopper down into the lower compartment 2 of the cabinet. Within this vertical chute is secured a segmental screen 13, of wire fabric or other suitable foraminous material, which is suitably attached to the walls of the chute and closes the same against the rapid passage therethrough of the flour or cereal, and this screen is designed to sift the flour or cereal as it passes through the vertical chute and prior to its delivery to the elevator. The cereal contained within the chute above the screen is agitated and positively forced through the openings or meshes of said screen by the action of a rotary agitator 14, which is carried by a transverse shaft 15, suitably journaled in the chute 12. I prefer to construct this agitator of wire blades, which are arranged to sweep close to or against the screen 13; but the detailed construction of the agitator is not important. The agitator is designed to be driven or rotated positively by suitable connections with the elevator, and in one embodiment of my invention I provide the agitator-shaft 15 with a suitable pulley 16, around which passes a driving-belt presently referred to. The flour or other cereal after having been screened in the chute 12 is delivered to a transverse inclined chute 17, which leads from the chute 12 to the elevator-casing 18. This elevator-casing is constructed to fit within the narrow chamber 8 at the rear of the cabinet; but it is considerably longer than the chute 12, alongside of which it is arranged. The upper end of said elevator-casing extends into the cupboard 3 for the purpose of delivering thereto the flour or cereal after it passes through and is cleaned by the screen in the chute 12. The elevator-casing is of any suitable construction, preferably rectangular, as indicated by the drawings, and it is arranged in a slightly-inclined position to enable the buckets or flights of the elevator to carry the cereal through said casing 18 to good advantage. As before stated, the upper end of the long elevator-casing terminates within the cupboard 3, and over said protruding end of the casing 18 is secured a hood 19, adapted to deflect and direct the flour or cereal lifted by the elevator into the chute 20. This chute lies transversely across the axial line of the elevator-casing and it is inclined downwardly toward the top 5 of the cabinet, the receiving end of the chute being adjacent to the hood 19 of the elevator-casing, whereby the chute is adapted to direct the flour from the elevator into a suitable receptacle.

In the elevator-casing are journaled the driving-shaft 21 and the idler-shaft 22. The driving-shaft 21 is arranged in the uper part of the elevator-casing to have one end thereof project into the cupboard 3, and on its shaft are secured the driving-roller 23 and the crank-disk 24. The driving-roller is attached to the shaft to lie within the casing 18, while the crank-disk is secured to a protruding end of the shaft 21, so that its crank is visible when the cupboard 3 is opened and it can be conveniently reached for the purpose of turning the shaft 21 by hand. The idler-shaft 22 at the lower end of the elevator-casing carries the idler-roller 25, and around the rollers 23 25 passes the endless elevator 26, which is provided with buckets or flights 27, that carry the flour from the lower end or foot of the elevator-casing 18 and deliver the same to the transverse chute 20 at the upper end of the casing 18. The lower shaft 22 of the elevator protrudes at both ends from opposite sides of the casing 18, and on the end of the shaft 22 which lies within the compartment 2 of the cabinet is secured a pulley 28, around which passes the belt 30, forming the operative connection from said pulley 28 to the pulley 16 on the agitator-shaft 15, whereby the idler-roller of the elevator is operatively connected with the agitator-shaft to positively rotate the agitator within the vertical chute 12.

In my improved cabinet I provide means for positively conveying the cereal from the storage bin or hopper 9 to the vertical chute 12, thus reducing to a minimum the improper feed of the cereal from the hopper or bin to the vertical chute and preventing the delivery-port 11 from choking or clogging, and this force-feed mechanism or conveyer is operated by suitable connections with the endless elevator, thus driving the elevator, agitator, and the force-feed conveyer from a single crank-disk 24. In the drawings I have shown the force-feed conveyer as consisting of a screw conveyer 31, arranged in the delivery-port 11 to have one end thereof terminate within the hopper or bin 9 and its other end within the vertical chute 12. The shaft 32 of this screw conveyer is journaled in suitable bearings provided in the hopper and chute of the cabinet, and one end of said conveyer-shaft is projected beyond the rear side of the vertical chute 12 to receive a pulley 33, around which passes a belt 34, that extends downwardly to a pulley $34^a$ on the end of the elevator idler-shaft 22, which terminates in the rear chamber 8 of the cabinet. It will thus be seen that when the elevator is in motion and the shaft 22 thereof is rotated the described pulleys and belt serve to operatively connect the conveyer 31 with the elevator, and thus the conveyer is rotated to force the contents of the hopper or bin 9 into the vertical chute 12.

I also provide my cabinet with a cut-off 35, arranged to close the port 11 and prevent the passage of the flour or cereal from the hopper into the vertical chute 12. This cut-off is pivotally attached, as at 36, to the partition or false back 6 of the cabinet in a position to swing across the delivery-port 11, and to one end of this cut-off is attached an operating cord or wire 37, which passes upwardly through a hole 38 in the top 4 of the lower compartment of the cabinet, the free end of said wire or cord 37 being readily accessible through the cupboard 3.

My cabinet embodies a kneading-board 40, which is slidably fitted to the lower part of the cabinet, below the top 4 thereof, and this kneading-board is adapted to be pushed into the cabinet to be concealed wholly below said top. The kneading-board is provided with the guide-strips 41, which extend beyond the rear end of the board proper, and these guide-strips are fitted to slide freely in the guide-ways 39, which are provided in the side walls of the cabinet, below the top 4 thereof. The guide-strips serve to sustain the kneading-board in proper position on the cabinet when the board is partly drawn out or extended beyond the top 4 thereof and occupy a position for convenient use of said board, and to facilitate the adjustment of the board I provide its front end with the knobs 42.

The cupboard 3 at the upper part of the cabinet is divided by a horizontal partition 43 into upper and lower chambers 44 45, and the lower chamber 44 has the hinged doors 46, which may be opened to enable the operator to have access to the crank-disk 24 of the elevator. Within this lower chamber of the cupboard is secured a deflector or housing 46ª, which overhangs the elevator, as shown. The upper compartment 45 of the cupboard is designed to be closed by the slide-doors 47, and it will thus be seen that these upper and lower compartments provide for the convenient storage of articles within the cabinet.

The operation of my invention may be described briefly as follows: To place the cereal in the bin or hopper of the cabinet, the kneading-board should be withdrawn beneath the top 5, and the flap-door 4 is raised to expose the bin and permit of the convenient introduction of the cereal therein. When it is desired to use the flour, the crank-disk of the elevator is operated, which moves the endless belt and causes the shaft 22 to drive the pulleys 28 and 33, thus rotating the agitator and the screw conveyer 31. The conveyer forces the cereal from the hopper or bin into the chute 12, and the agitator 14 causes the cereal to pass through the screen 13, after which the screened material is deposited on the transverse chute 17, into position to be reached by the buckets or flights on the elevator that carries the flour up to the chute 20, which in turn delivers it into a suitable receptacle. The kneading-board may be drawn out a suitable distance beyond the top 5 to enable it to be used, and the said board may be pushed back into its guideways 39 below the top 4.

From the foregoing description, taken in connection with the drawings, it will be seen that I have provided a cabinet in which the means for conveying the flour or cereal from the bin to the said chute and for screening the flour or cereal are compactly arranged within the cabinet to take up a very small amount of room therein and that said cleaning and elevating appliances do not require the handling of the flour or cereal for the purpose of cleaning and delivering it to the place to be used.

It is evident that changes in the form and proportion of parts may be made by a skilled mechanic without departing from the spirit or sacrificing the advantages of the invention.

Having thus described the invention, what I claim is—

1. In a kitchen-cabinet, the combination with a bin and a chute leading therefrom, of a screen device situated in said chute, an agitator supported within the chute above said screen, an elevator to receive from the chute, a force-feed mechanism to transfer the contents of the bin to the chute, and operative connections between the elevator, the agitator and the force-feed mechanism, substantially as and for the purposes described.

2. In a kitchen-cabinet, the combination with a hopper or bin, of a vertical chute communicating with said hopper, a screen across the chute, an agitator above said screen, an elevator arranged to receive from the chute below the screen, a screw conveyer operating in the chute and the hopper and situated above said screen, and driving connections from said elevator to the screw conveyer and the agitator, substantially as described.

3. In a kitchen-cabinet, the combination with a bin or hopper, and a chute situated in rear of said hopper and communicating therewith through a transverse port, an elevator arranged to receive from said chute, a fixed screen within the chute and below the port between the latter and the hopper, an agitator journaled within the chute above the screen, a screw conveyer operating in the delivery-port between the hopper and the chute, and belt connections from the elevator to the screw conveyer and the agitator, substantially as and for the purposes described.

4. A kitchen-cabinet provided with a hopper and a partition or false back arranged between the hopper and the rear wall of the cabinet forming therewith a narrow chamber at the rear side of said cabinet, combined with a chute situated in said chamber and communicating with the hopper through a transverse port, a screen device located within the chute, an agitator above said screen, an elevator also arranged within the narrow rear chamber of the cabinet and having its delivery end extending into the upper part of said cabinet, a screw conveyer located in the port between the hopper and the chute, and operative connections between said elevator, the agitator, and the conveyer, substantially as and for the purposes described.

5. In a kitchen-cabinet, the combination with a hopper, a vertical chute communicating with the hopper, and a screen within said vertical chute, of an elevator arranged alongside of the chute and provided at its upper end with a hood and a transverse delivery-chute, an inclined transfer-chute between the lower end of the vertical chute and the elevator, a screw conveyer in the passage or port between the vertical chute and the hopper, and operative connections from the elevator to the screw conveyer, substantially as described.

In testimony that I claim the foregoing as my own I have hereto affixed my signature in the presence of two witnesses.

WILLIAM HAMILTON MAY.

Witnesses:
JOHN B. MCKNIGHT,
JACOB S. HIMLEY.